US011917237B2

(12) United States Patent
Kao et al.

(10) Patent No.: US 11,917,237 B2
(45) Date of Patent: Feb. 27, 2024

(54) MOVE STREAM CONTENT FROM POINT TO POINT OVER THE EXISTING IP GATEWAY

(71) Applicant: Intel Corporation, Santa Clara, CA (US)

(72) Inventors: Li-Gong Kao, Taoyuan (TW); Chuan Hua Lei, Singapore (SG)

(73) Assignee: Intel Corporation, Santa Clara, CA (US)

( * ) Notice: Subject to any disclaimer, the term of this patent is extended or adjusted under 35 U.S.C. 154(b) by 262 days.

(21) Appl. No.: 17/167,189

(22) Filed: Feb. 4, 2021

(65) Prior Publication Data

US 2021/0258635 A1 Aug. 19, 2021

Related U.S. Application Data

(60) Provisional application No. 62/976,399, filed on Feb. 14, 2020.

(51) Int. Cl.
*H04N 21/436* (2011.01)
*H04N 21/414* (2011.01)
*H04N 21/4363* (2011.01)
*H04N 21/61* (2011.01)

(52) U.S. Cl.
CPC . *H04N 21/43615* (2013.01); *H04N 21/41407* (2013.01); *H04N 21/43637* (2013.01); *H04N 21/6131* (2013.01)

(58) Field of Classification Search
CPC ....... H04N 21/43615; H04N 21/41407; H04N 21/43637; H04N 21/6131; H04L 12/2818
See application file for complete search history.

(56) References Cited

U.S. PATENT DOCUMENTS

| 8,028,093 | B2 * | 9/2011 | Karaoguz | .......... H04N 21/4532 725/140 |
| 2002/0062361 | A1 * | 5/2002 | Kivipuro | ............. G06Q 20/145 709/219 |
| 2007/0280213 | A1 | 12/2007 | Sindhwani et al. | |
| 2008/0120673 | A1 * | 5/2008 | Dong | ................. H04N 21/4113 348/E7.071 |
| 2009/0019492 | A1 * | 1/2009 | Grasset | ............. H04N 21/4325 348/E7.071 |
| 2009/0070692 | A1 * | 3/2009 | Dawes | ................ H04L 12/2818 715/764 |
| 2010/0131989 | A1 * | 5/2010 | Casimere | ........... H04N 21/4532 725/62 |

(Continued)

FOREIGN PATENT DOCUMENTS

WO 2012114073 A1 8/2012

*Primary Examiner* — Fernando Alcon
(74) *Attorney, Agent, or Firm* — 2SPL Patent Attorneys PartG mbB; Yong Beom Hwang

(57) ABSTRACT

An access point for a home network is provided. The access point includes a processor circuit. When executing software, the processor circuit is configured to receive media stream data from a media source external to the access point. Further, the processor circuit is configured to generate output data for a display device based on the received media stream data. The access point also includes an output interface for connecting to the display device. The output interface is configured to output the output data.

18 Claims, 2 Drawing Sheets

(56) References Cited

U.S. PATENT DOCUMENTS

| | | | |
|---|---|---|---|
| 2010/0260468 A1* | 10/2010 | Khatib | H04N 21/2662 |
| | | | 386/282 |
| 2010/0281508 A1* | 11/2010 | Poder | H04L 12/4633 |
| | | | 725/109 |
| 2011/0163939 A1* | 7/2011 | Tam | G06F 3/1454 |
| | | | 345/2.3 |
| 2011/0299448 A1* | 12/2011 | Meier | H04L 12/18 |
| | | | 370/312 |
| 2011/0299548 A1* | 12/2011 | Chen | H04L 67/1078 |
| | | | 370/401 |
| 2012/0124613 A1* | 5/2012 | Reddy | H04N 21/6334 |
| | | | 725/27 |
| 2012/0284736 A1* | 11/2012 | Friedman | H04N 21/2665 |
| | | | 725/116 |
| 2012/0290937 A1* | 11/2012 | Rothschild | H04N 21/43637 |
| | | | 709/219 |
| 2013/0212222 A1* | 8/2013 | Outlaw | H04L 65/613 |
| | | | 709/219 |
| 2013/0278706 A1* | 10/2013 | Connelly | H04N 21/4316 |
| | | | 348/584 |
| 2015/0054947 A1* | 2/2015 | Dawes | G08B 13/19682 |
| | | | 348/143 |
| 2015/0172345 A1* | 6/2015 | Mantin | H04N 21/6125 |
| | | | 709/219 |
| 2015/0312648 A1* | 10/2015 | Zhang | H04N 21/4131 |
| | | | 725/110 |
| 2016/0070444 A1 | 3/2016 | Valimaki et al. | |
| 2017/0280170 A1* | 9/2017 | Hongo | H04N 21/6405 |
| 2018/0123819 A1* | 5/2018 | Ansari | H04N 21/43615 |
| 2020/0014974 A1 | 1/2020 | Patel et al. | |
| 2020/0245380 A1 | 7/2020 | Hruby et al. | |

\* cited by examiner

MOVE STREAM CONTENT FROM POINT TO POINT OVER THE EXISTING IP GATEWAY

CROSS-REFERENCE TO RELATED APPLICATIONS

This application claims priority to U.S. Provisional Application 62/976,399, filed Feb. 14, 2020, the contents of which are incorporated by reference herein in their entirety.

FIELD

The present disclosure relates to media streaming. In particular, examples relate to an access point for a home network.

BACKGROUND

A conventional home gateway can be used as a data packet forwarding engine between different networks.

There are a few different ways to stream video to TV (Television). Normally, each video streaming protocol has a specific display adapter or dongle as a receiver for casting the mobile/tablet screen to TV. Dedicated streaming boxes may allow content from major providers like Netflix and Apple TV+ to be viewed. To set up a streaming video at home, the user may need to purchase a gateway for the internet connection and another box or dongle for streaming video.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. This detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

Figure 1:
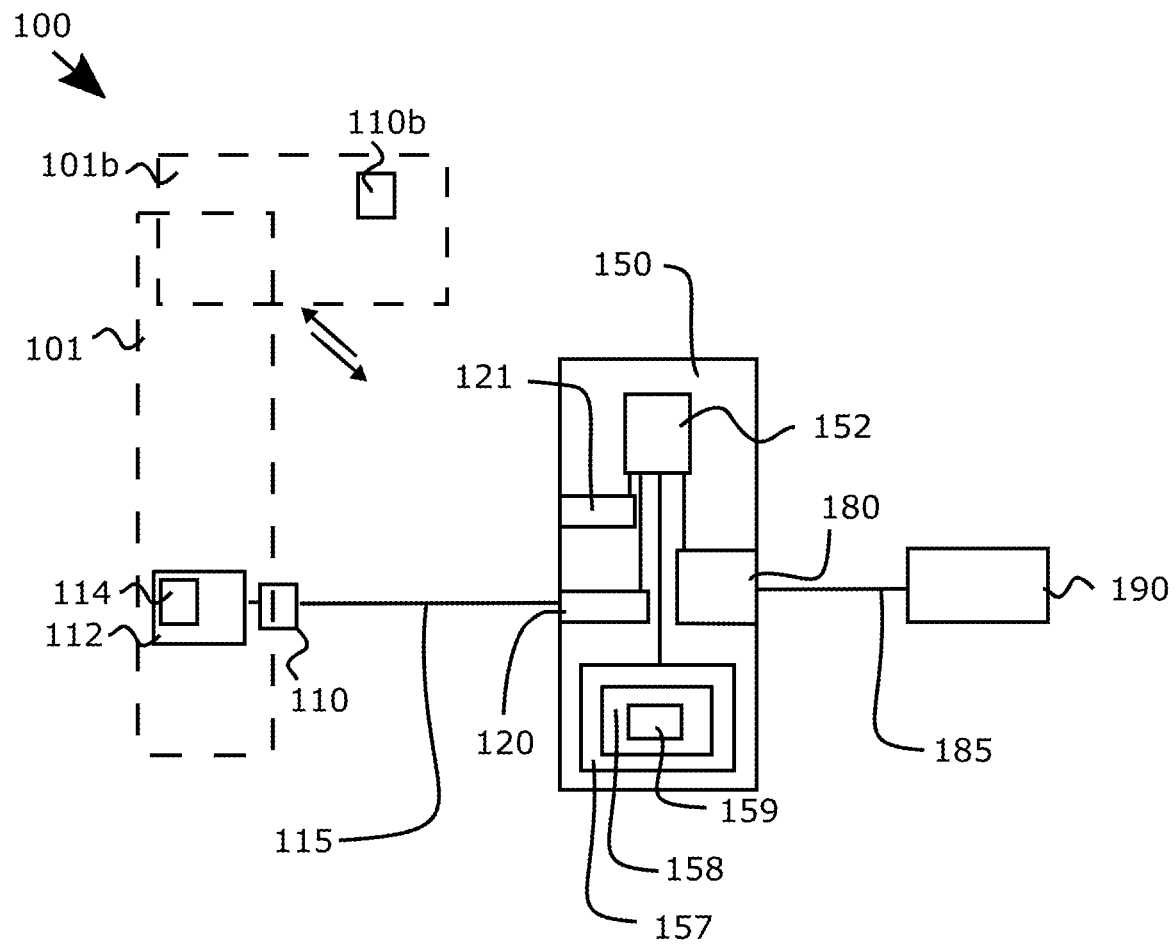
FIG. 1 illustrates a system including an access point in a wide area network.

FIG. 1 illustrates a system 100 including an access point 150. The access point 150 can be configured to communicate with a wide area network 101 and/or home network 101b. The access point 150 and/or home network 101b can include a router circuit 120, such as for connecting to a wide area network 101. The access point 150 can include a memory circuit 157 that can store software 158, such as media source application(s). The access point 150 includes a processor circuit 152 which can be coupled to the memory circuit 157. The processor 152 can execute the software 158. The processor circuit 152 can, such as when executing the software 158, receive media stream data 115 from a media source 110 external to the access point 150. The processor circuit 152 can generate output data 185 for a display device 190 based on the received media stream data 115. The access point 150 includes, as shown in FIG. 1, an output interface 180 for connecting to a display device 190. The output interface 180 is configured to output the output data 185.

The software 158 of the access point 150 can include at least one media source application 159. The media source application(s) 159 can be used to establish a connection(s) to the media source(s) 110.

The media source application(s) 159 of the access point 150 can be for streaming media content 114 of content provider(s) 112. The media source 110 can be a server which is accessible via the wide area network 101. The media source 110 can store the media content 114. The media stream data 115 can be at least in part received from the server.

The router circuit 120 of the access point can receive the media stream data 115 from the media source 110 (or server). The media stream data 115 can be passed to processor circuit 150.

The media source application(s) 159 of the access point 150 can alternatively/additionally be for streaming media content from a mobile device 110b in a home network 101b. For example, the media source 110 can be a mobile device 110b, and the media stream data 115 is at least in part received from the mobile device 110b.

The access point can include wireless communication circuitry 112. The media stream data 115, such as from the mobile device 110b, can be received by the wireless communication circuitry 112 and passed to the processor circuit 152.

The wireless communication circuitry 112 can receive the media stream data 115, e.g. from the mobile device 110b, in accordance with the IEEE 802.11 family of standards of the Institute of Electrical and Electronics Engineers, IEEE.

The processor circuit 152 can determine the intended recipient of the media stream data 115 based on the media stream data 115; and generate the output data 185 only if it is determined that the display device 190 is intended recipient.

If it is determined that an entity outside the home network 101b is the intended recipient, the router circuit 120 is configured to pass the media stream data to the wide area network 101.

The processor circuit 152 can generate the output data 185 by encoding the media stream data 115 according to a predetermined data transmission standard. The processor circuit 152 can decompress the media stream data 115 in accordance with a video and/or audio compression standard prior to encoding. The data transmission standard can be the Universal Serial Bus, USB, standard or the High-Definition Multimedia Interface, HDMI, standard.

The output interface 180 can be adapted to receive a connector for wired connection to the display device 190. The output interface 180 can be a connector in accordance with the Universal Serial Bus, USB, standard, or the High-Definition Multimedia Interface, HDMI, standard.

The wide area network 101 can include a wired wide area network and/or a wireless wide area network (such as a cellular network), such as one of a Digital Subscriber Line, DSL, network, an optical network, and a cable television network.

The access point 150 can be a residential gateway for connecting the home network 101b to the wide area network 101. Also, the access point 150 can be a wireless range extender.

Figure 2:
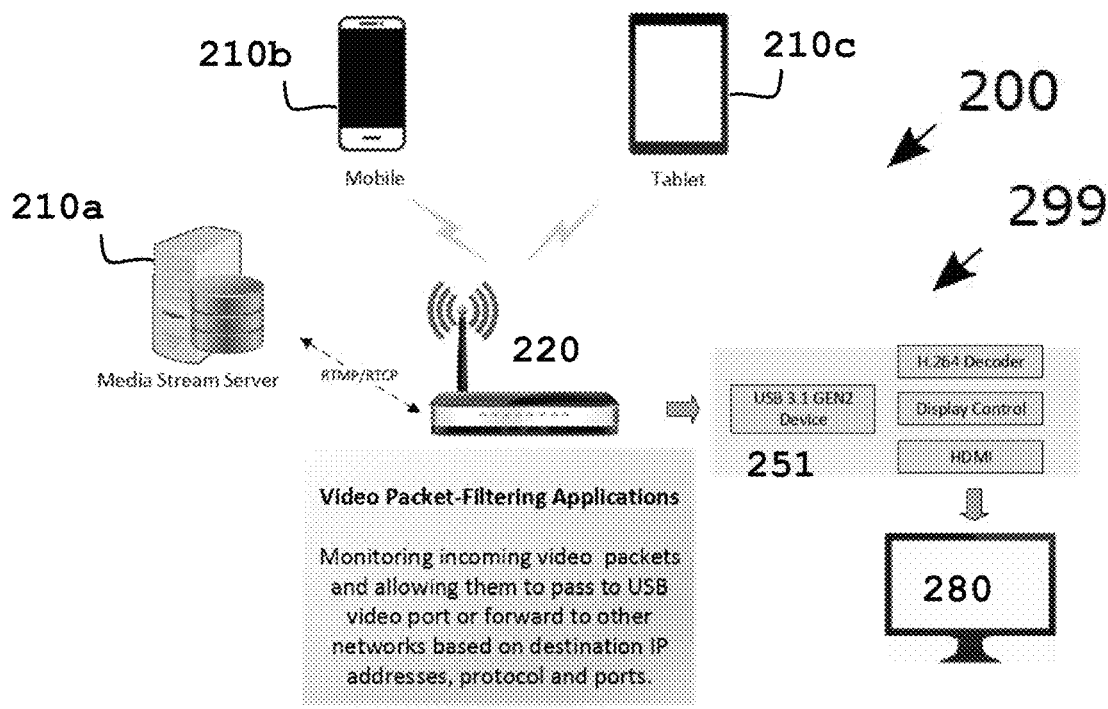
FIG. 2 illustrates an example of an access point for a home network.

FIG. 2 illustrates an example of an access point 200 for a home network. The example of FIG. 2 can enable video feature in or through a gateway 299 by connecting gateway 299 to TV 280 via Universal Serial Bus (USB)-to-High Definition Multimedia Interface (HDMI) adapter 251 with an external video card that can transmit video and audio to TV 280. With the video stream gateway 299 and/or access point 200, users can examine specific Real-Time Messaging Protocol (RTMP)/Real-time Transport Control Protocol (RTCP) video stream (e.g. H.264) from devices such as a laptop, mobile 210b, tablet 210c, and/or media server 210a for an approved protocol or tag. The video stream can pass to a TV 280, for example, through a USB port and/or HDMI port on the gateway 299 without any additional adapter hooked to the TV 280, such as another adapter for streaming. Multiple streaming protocols can be combined into the gateway 299 and/or access point 200. The gateway 299 and/or access point 200 can be a network access point and/or an intermediate point of streaming content to and from TV 280.

The gateway 299 and/or access point 200 can combine the functions of a wireless access point 200 and a router 220 and can provide streaming video to devices such as a big-screen TV as well. The gateway 299 and/or access point 200 can allow users to use services to rent or buy movies, such as directly with a third-party app. People are able to enjoy videos, photos, movies and more using the access point 200 and/or gateway 299, such as one with a USB to HDMI adapter (or HDMI cable). The gateway 299 and/or access point 200 may be used in multiple product lines (like gateway, TV box and streaming video device). A user and/or customer may create and maintain his/her own product based on the proposed gateway 299 and/or access point 200 and/or network processor System on Chips (SoCs).

Figure 3:
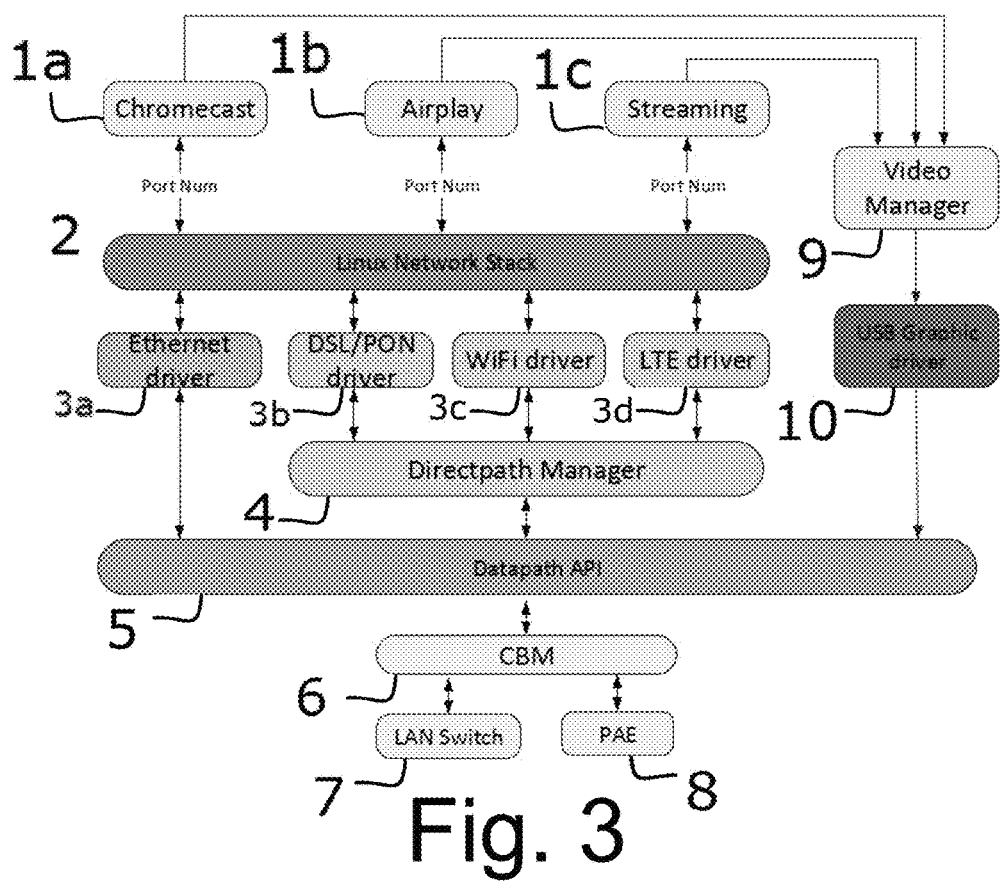
FIG. 3 illustrates an example of the software structure of an access point for a home network.

FIG. 3 illustrates an example of a block diagram of the software structure 300 of an access point 200 for a home network. FIG. 3 shows building blocks which may include software drivers, user applications, and hardware (HW) components. FIG. 3 also illustrates the interaction and data flow of packets through the different modules and/or blocks.

The components in the exemplary system and/or software structure can include a CBM 6: Central Buffer Manager 6 which can be for hardware allocation of buffers to be used in Direct memory access (DMA) when packets are received/transmitted at network interfaces. A PAE 8, or Packet Acceleration Engine 8, such as for packet L2 to L7 parsing, L2 switching, L3 and L4 routing acceleration in hardware can be included. A LAN-switch 7 and/or Local Area Network (LAN) ethernet ports can be included. A Datapath Application Programming Interface (API) can be included, such as for support for port initialization, sub interface registration and driver interface requirement(s). A Directpath driver and/or directpath manager 4 can be included, which can be a module that allows PCIe attached device such as Wi-Fi (e.g based on the IEEE 802.11 family of standards of the Institute of Electrical and Electronics Engineers, IEEE)/Long-Term Evolution (LTE)/Digital Subscriber Line (DSL)/Passive Optical Network (PON) to register and use partial offload.

Also there can be included a Chromecast application 1a, e.g. to process display messages from the sender application for Android. Also there can be included an Airplay application, for example to share videos, music and more from Apple devices to TV. Also there can be included a streaming service application 1c, for example for streaming services for movies, TV series and sports on TV.

The components in the exemplary system and/or software structure can include a video manager 9 which can be used to send/receive media messages/events and can establish communication with USB graphic driver 10. The USB graphic driver 10 can capture the streaming data, encode, and send to the USB-to-HDMI device. The HDMI output, for example, may be transmitted to a TV.

The packet flow for hardware and software connectivity may be as in the following examples. The access point as described herein may be configured to enable the following examples.

An example of Chromecast/Airplay protocol data flow via WIFI:
  Chromecast/Airplay application 1a, 1b on mobile/tablet→WIFI HW→WIFI driver→Directpath driver 4→Datapath API Driver 5→CBM 6→PAE 8→CBM 6→Datapath API Driver 5→Directpath driver 4→WIFI driver 3c→Linux Network Stack 2→Chromecast/Airplay application 1a/1b→Video manager 9→USB graphic driver 10→HDMI→TV.

An example of Chromecast/Airplay protocol data flow via WIFI with PAE acceleration:
  Chromecast/Airplay application 1a/1b on mobile/tablet→WIFI HW→WIFI driver→Directpath driver 4→Datapath API driver 5→CBM 6→PAE 8→CBM 6→PAE 4→USB graphic driver 10→HDMI→TV.

An example of streaming server to TV data flow via xDSL WAN (Wide Area Network):
  Media Stream Server 1c→xDSL WAN→xDSL Driver→Directpath driver 4→Datapath API Driver 5→CBM 6→PAE 8→CBM 6→Datapath API Driver 5→Directpath driver→xDSL Driver→Linux Network Stack 2→Streaming Service application 1c→Video manager 9→USB graphic driver 10→HDMI→TV.

An example of streaming server to TV data flow via xDSL WAN with PAE acceleration:
  Media Stream Server 1c→xDSL WAN→xDSL Driver→Directpath driver 4→Datapath API Driver 5→CBM 6→PAE 8→CBM 6→PAE 8→USB graphic driver 10→HDMI→TV.

It will be understood that when an element is referred to as being "connected" or "coupled" to another element, the elements may be directly connected or coupled via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two elements.

The terminology used herein for the purpose of describing particular examples is not intended to be limiting for further examples. Whenever a singular form such as "a", "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising", "includes" and/or "including", when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. The program may be stored on nontransitory or transitory machine readable media. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

When functions described herein can be provided by a processor, the functions may be provided by a single dedicated processor, by a single shared processor, or by a plurality of individual processors, some of which or all of which may be shared. The term "processor" or "controller" can include, for example, digital signal processor (DSP) hardware, a network processor, an application specific integrated circuit (ASIC), a field programmable gate array (FPGA), a read only memory (ROM) for storing software, a random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may be substantially represented in computer readable medium and executed by a computer or processor. Methods disclosed in the specification or in the claims may be implemented by a device that can perform each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

The following enumerated examples are described herein. Aspects described in the following examples may be combined with examples described with respect to one or more of the figures above and vice versa.

Example 1. An access point for a home network, comprising a processor circuit. When executing software, the processor circuit is configured to receive media stream data from a media source external to the access point; and generate output data for a display device based on the received media stream data. The access point includes an output interface for connecting to the display device, and the output interface is configured to output the output data.

2. The access point of example 1, wherein the software comprises at least one media source application, and wherein the processor circuit is further configured to establish a connection to the media source using the at least one media source application.

3. The access point of example 2, wherein the at least one media source application is for streaming media content of a content provider, wherein the media source is a server accessible via the wide area network and storing the media content, and wherein the media stream data is at least in part received from the server.

4. The access point of example 3, wherein the router circuit is configured to:
receive the media stream data from the server; and
pass the media stream data to processor circuit.

5. The access point of any of examples 2 to 4, wherein the at least one media source application is for streaming media content from a mobile device in the home network, wherein the media source is the mobile device, and wherein the media stream data is at least in part received from the mobile device.

6. The access point of example 5, further comprising wireless communication circuitry configured to wirelessly receive the media stream data from the mobile device, and to pass the media stream data to the processor circuit.

7. The access point of example 6, wherein the wireless communication circuitry is configured to receive the media stream data from the mobile device in accordance with the IEEE 802.11 family of standards of the Institute of Electrical and Electronics Engineers, IEEE.

8. The access point of any of examples 1 to 7, wherein the processor circuit is configured to:
determine the intended recipient of the media stream data based on the media stream data; and
generate the output data only if it is determined that the display device is intended recipient.

9. The access point of example 8, wherein, if it is determined that an entity outside the home network is the intended recipient, the router circuit is configured to pass the media stream data to the wide area network.
10. The access point of any of examples 1 to 9, wherein the processor circuit is configured to generate the output data by encoding the media stream data according to a predetermined data transmission standard.
11. The access point of example 10, wherein the processor circuit is configured to decompress the media stream data in accordance with a video and/or audio compression standard prior to encoding.
12. The access point of example 10 or example 11, wherein the data transmission standard is the Universal Serial Bus, USB, standard or the High-Definition Multimedia Interface, HDMI, standard.
13. The access point of any of examples 1 to 12, wherein the output interface is adapted to receive a cable connector for wired connection of the display device.
14. The access point of example 13, wherein the output interface is a connector in accordance with the Universal Serial Bus, USB, standard or the High-Definition Multimedia Interface, HDMI, standard.
15. The access point of any of examples 1 to 14, wherein the wide area network is a wired wide area network or a wireless wide area network.
16. The access point of example 15, wherein the wired wide area network is one of a Digital Subscriber Line, DSL, network, an optical network and a cable television network.
17. The access point of example 15, wherein the wireless wide area network is a cellular network.
18. The access point of any of examples 1 to 17, wherein the access point is a residential gateway for connecting the home network to the wide area network.
19. The access point of any of examples 1 to 17, wherein the access point is a wireless range extender.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. An access point for a home network, comprising:
   a processor circuit, wherein, when executing software, the processor circuit is configured to:
   receive media stream data from a media source external to the access point; and
   generate output data for a display device based on the received media stream data; and
   an output interface for connecting to the display device, wherein the output interface is configured to output the output data,
   wherein the processor circuit is configured to determine an intended recipient of the media stream data based on the media stream data and generate the output data only if it is determined that the intended recipient is the display device.

2. The access point of claim 1, wherein the software comprises at least one media source application, and wherein the processor circuit is further configured to establish a connection to the media source using the at least one media source application.
3. The access point of claim 2, wherein the at least one media source application is for streaming media content of a content provider, wherein the media source is a server accessible via a wide area network and storing the media content, and wherein the media stream data is at least in part received from the server.
4. The access point of claim 3, further comprising
   a router circuit configured to connect to the wide area network;
   wherein the router circuit is configured to:
   receive the media stream data from the server; and
   pass the media stream data to the processor circuit.
5. The access point of any of claim 4, wherein the at least one media source application is for streaming media content from a mobile device in the home network, wherein the media source is the mobile device, and wherein the media stream data is at least in part received from the mobile device.
6. The access point of claim 5, further comprising
   wireless communication circuitry configured to wirelessly receive the media stream data from the mobile device, and to pass the media stream data to the processor circuit.
7. The access point of claim 6, wherein the wireless communication circuitry is configured to receive the media stream data from the mobile device in accordance with the IEEE 802.11 family of standards of the Institute of Electrical and Electronics Engineers, IEEE.
8. The access point of claim 1, further comprising
   a router circuit for configured to connect to a wide area network,
   wherein if it is determined that an entity outside the home network is the intended recipient, the router circuit is configured to pass the media stream data to the wide area network.
9. The access point of claim 8, wherein the processor circuit is configured to generate the output data by encoding the media stream data according to a predetermined data transmission standard.
10. The access point of claim 9, wherein the processor circuit is configured to decompress the media stream data in accordance with a video and/or audio compression standard prior to encoding.
11. The access point of claim 10, wherein the data transmission standard is the Universal Serial Bus, USB, standard or the High-Definition Multimedia Interface, HDMI, standard.
12. The access point of claim 11, wherein the output interface is adapted to receive a connector for wired connection to the display device.
13. The access point of claim 12, wherein the output interface is a connector in accordance with the Universal Serial Bus, USB, standard or the High-Definition Multimedia Interface, HDMI, standard.
14. The access point of claim 13, wherein the wide area network is a wired wide area network or a wireless wide area network.
15. The access point of claim 14, wherein the wired wide area network is one of a Digital Subscriber Line, DSL, network, an optical network and a cable television network.
16. The access point of claim 14, wherein the wireless wide area network is a cellular network.

17. The access point of claim 16, wherein the access point is a residential gateway for connecting the home network to the wide area network.

18. The access point of claim 16, wherein the access point is a wireless range extender.

\* \* \* \* \*